United States Patent [19]
Hodnett, III

[11] Patent Number: 5,254,395
[45] Date of Patent: * Oct. 19, 1993

[54] PROTECTIVE COATING SYSTEM FOR IMPARTING RESISTANCE TO ABRASION, IMPACT AND SOLVENTS

[75] Inventor: William P. Hodnett, III, Martinsville, Va.

[73] Assignee: Thor Radiation Research, Inc., Va.

[*] Notice: The portion of the term of this patent subsequent to May 19, 2009 has been disclaimed.

[21] Appl. No.: 815,329

[22] Filed: Dec. 27, 1991

Related U.S. Application Data

[63] Continuation-in-part of Ser. No. 235,917, Aug. 23, 1988, Pat. No. 5,114,783.

[51] Int. Cl.⁵ .......................... B32B 7/02; B32B 27/00
[52] U.S. Cl. .................... 428/217; 428/424.2; 428/461; 428/424.4; 428/425.8; 428/908.8
[58] Field of Search ...................... 428/217, 424.2, 461

[56] References Cited

U.S. PATENT DOCUMENTS

| | | | |
|---|---|---|---|
| 4,273,802 | 1/1981 | Kamada et al. | 428/412 |
| 4,501,767 | 2/1985 | Iimure | 427/54.1 |
| 4,557,980 | 12/1985 | Hodnett, III | 428/336 |
| 4,830,909 | 5/1989 | Cohen et al. | 428/423.1 |
| 5,114,783 | 5/1992 | Hodnett, III | 428/217 |

Primary Examiner—George F. Lesmes
Assistant Examiner—Terrel Morris
Attorney, Agent, or Firm—Bell, Seltzer, Park & Gibson

[57] ABSTRACT

This invention relates to a coating system which forms a highly abrasion resistant, chemical resistant, impact resistant protective finish for a substrate. The coating system is based upon using two coatings of different characteristics but having excellent adhesion to one another. The outermost or surface coating layer is a highly crosslinked hard polymer, which is adhered to an underlying base coating layer of a compatible softer polymer. The outer hard polymer preferably comprises a highly crosslinked acrylic copolymer derived from at least 40 percent by weight of a multifunctional aliphatic acrylate monomer of three or more functional groups, while the underlying softer polymer preferably comprises a crosslinked aliphatic urethane acrylate copolymer and the multifunctional aliphatic acrylate monomer of three or more functional groups.

17 Claims, 1 Drawing Sheet

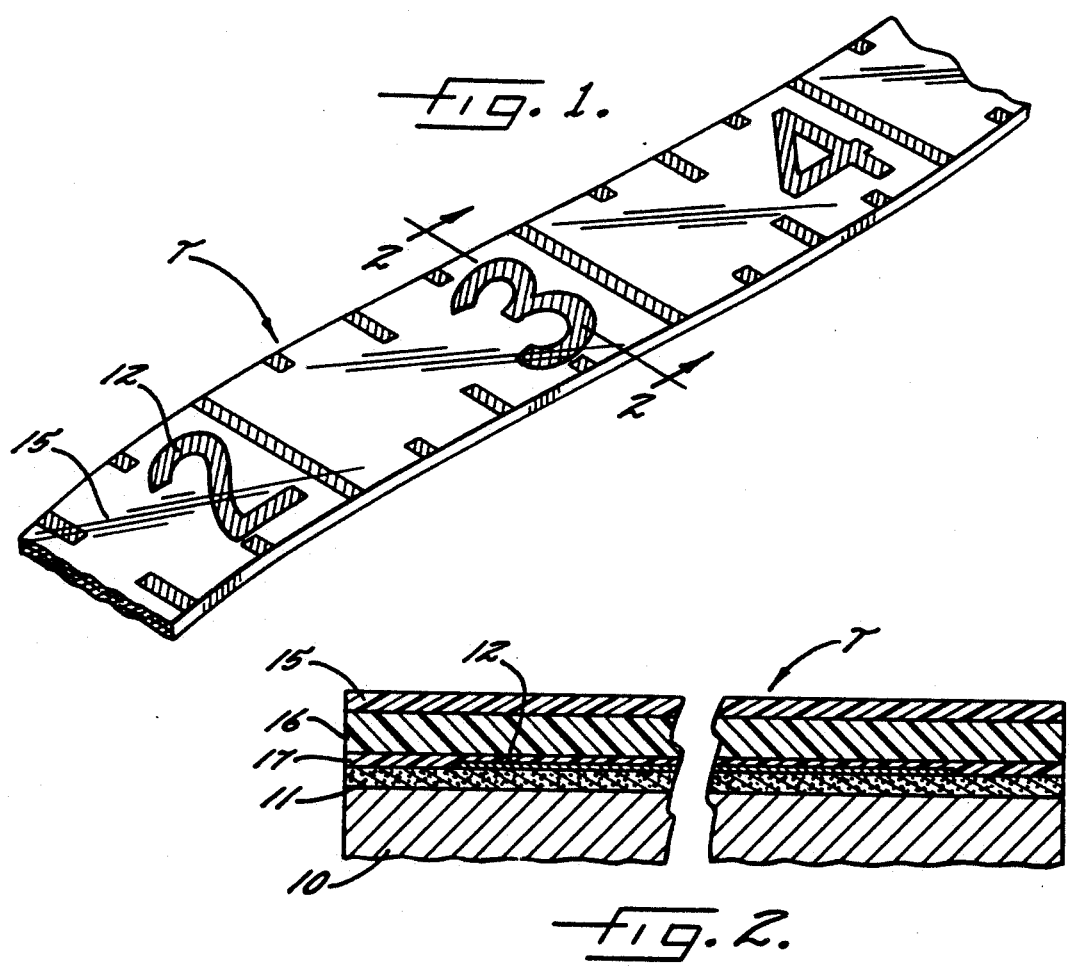

PROTECTIVE COATING SYSTEM FOR IMPARTING RESISTANCE TO ABRASION, IMPACT AND SOLVENTS

RELATED APPLICATION

This application is a continuation-in-part of U.S. Ser. No. 07/235,917 filed Aug. 23, 1988, now U.S. Pat. No. 5,114,783.

BACKGROUND OF THE INVENTION

This invention relates to a coating system which forms a highly abrasion resistant, chemical resistant, impact resistant protective finish for a substrate.

Coating compositions have been developed which, when applied to a substrate and cured, impart a highly abrasion resistant surface to the substrate. Coating compositions of this type have been widely used to impart abrasion resistance to plastic lenses such as eyeglass lenses, to plastic panels and films, to wood surfaces such as furniture, and many other applications where an abrasion resistant or scratch resistant surface finish is of importance.

Abrasion resistant coatings of this type are typically based upon acrylate monomers which are cured or crosslinked after application of the coating, typically by radiation curing. Radiation curable coatings offer the advantage of being rapidly cured and polymerized without requiring curing ovens and they can be applied and processed without having to remove solvents and deal with solvent vapors in the workplace environment.

It is known that radiation cured acrylate polymers can produce very hard (glass hard) protective coatings which exhibit superior abrasion and chemical resistance properties. Although the coatings are quite hard and resistant to abrasion and scratching, they are brittle and have a tendency to crack and peel from the substrate, especially when applied to relatively flexible substrates or when subjected to impact.

Prior abrasion resistant coatings have sought to deal with the brittleness and cracking problem by using a softening comonomer (a monomer with a low second order transition temperature) to impart some degree of flexibility to the coating. However, in achieving increased flexibility and reduced brittleness, the abrasion resistance of the coating is sacrificed. Thus, for example, U.S. Pat. No. 4,319,811 discloses an abrasion resistant radiation curable coating based upon tri- and tetraacrylate monomers, such as pentaerythritol triacrylate with a comonomer such as vinyl pyrrolidone or vinyl caprolactam. U.S. Pat. No. 4,308,119 discloses an abrasion resistant radiation curable coating composition comprised of a pentaerythritol tetraacrylate with a cellulose ester such as cellulose acetate butyrate. U.S. Pat. No. 4,557,980 discloses a radiation curable coating composition based upon a mixture of a triacrylate or tetraacrylate, such as pentaerythritol tetraacrylate, with acrylic acid.

The resistance of a coating to scratching abrasion is typically measured by the rotary steel wool test, which involves subjecting the coating to five revolutions of a pad of 0000 grade steel wool at a defined pressure, usually 12 or 24 psi. The scratching abrasion resistance is rated by measuring the increase in haze from the abrasion. Test methods such as ASTM D-1044 have been developed for optically measuring the resistance of transparent plastic materials to abrasion. Other standard tests for abrasion resistance are the Taber abrasion test described in ASTM D-1004-56.

In many applications, the protective finish needs not only to be "hard" and thus resistant to scratching, but also must have excellent toughness and resistance to impact. The toughness or impact abrasion resistance of a coating is commonly measured by the "falling sand" test (ASTM D968-51). A coating which has good scratch abrasion resistance may not necessarily have good impact abrasion resistance. With the falling sand test, sand is poured onto a coating from a predetermined height, while the thickness of the coating is observed. The results are expressed in terms of the number of liters of sand required to abrade away one tenth of a mil of the coating thickness. The radiation cured abrasion resistance coatings noted in the aforementioned prior patents have a relatively poor resistance to impact abrasion which renders these types of coatings unacceptable for applications requiring both good resistance to scratching abrasion and good resistance to impact abrasion.

With the foregoing in mind, it is an important object of the present invention to provide a coating system which provides not only good resistance to scratching abrasion, but also provides excellent resistance to impact abrasion.

SUMMARY OF THE INVENTION

The present invention provides an abrasion resistant coating system for imparting a highly scratch resistant, chemical resistant and impact resistant protective finish to a substrate. The coating system of the present invention is based upon using two coatings of different characteristics but having excellent adhesion to one another. The outermost or surface coating layer is a highly crosslinked hard polymer, which is adhered to an underlying base coating layer of a compatible softer polymer. The outer hard polymer preferably comprises a highly crosslinked acrylic polymer, while the underlying softer polymer preferably comprises a crosslinked urethane polymer. The outer hard polymer imparts a highly scratch resistant abrasion resistant surface finish, while the underlying base polymer layer exhibits excellent toughness and impact abrasion resistance. The coating system is also clear, highly transparent and non-yellowing so that it effectively serves as a protective coating layer without affecting the color or clarity of the substrate. The outer highly crosslinked hard polymer preferably has a Rockwell hardness of at least 105, and most desirably 115 or greater (Rockwell Hardness "M" scale) while the underlying softer polymer preferably has a Rockwell hardness of no more than about 50, and most desirably about 40 or less (Rockwell Hardness "M" scale). The respective coating layers are preferably cured by exposure to radiation.

More specifically, the outermost hard coating layer may comprise a highly crosslinked acrylic copolymer derived from a multifunctional acrylate monomer of three or more functional groups, most desirably a pentafunctional acrylate monomer. The underlying softer base coating layer may comprise a crosslinked aliphatic urethane acrylate copolymer derived from a difunctional or multifunctional acrylated urethane resin, and a lesser proportion of the multifunctional acrylated monomer of three or more functional groups.

BRIEF DESCRIPTION OF THE DRAWINGS

Some of the features and advantages having been stated, others will become apparent from the detailed description which follows, and from the accompanying drawings, in which FIG. 1 is a perspective view showing a steel measuring tape which is coated with the protective coating system of the present invention, and FIG. 2 is a cross-sectional view of a portion of the steel tape of FIG. 1, taken substantially along the line 2—2 and illustrating the respective layers of the coating system of the present invention.

DESCRIPTION OF ILLUSTRATIVE EMBODIMENTS

The superior radiation polymerized protective coating system of the present invention may be used advantageously on a wide range of substrates such as wood, glass, rubber, plastics, cellulosic products, metal surfaces such as aluminum, steel, brass, and surfaces with various types of applied coatings such as paints, varnishes, lacquers, and primers. The coating system is especially applicable to various polymeric substrates such as polycarbonate, polystyrene, polyester, diglycol carbonate (e.g. CR-39), either in the form of films, sheets, or shapes. The invention has particular applicability as a protective transparent abrasion resistant coating for painted surfaces such as painted metal and wood surfaces.

FIG. 1 shows a steel measuring tape T having a painted surface which is printed with markings 12 of a contrasting color. The upper surface of the tape T is coated substantially throughout with the protective coating system of the present invention. As shown in more detail in FIG. 2, the steel tape substrate 10 has its front surface coated with an opaque paint coating 11. Indicia markings 12 are printed on the paint coating 11. The coating system comprises a outermost surface layer 15 of a highly crosslinked radiation cured acrylic polymer of very high hardness, which yields scratch and chemical resistance to the surface. The outer layer 15 should preferably have a Rockwell hardness ("M" scale reading) of at least 105, and most desirably 115 or greater. The Rockwell hardness of the coating is typically tested in accordance with the procedures outlined in ASTM Test Method D-785, Procedure A. This coating layer may typically range in thickness from about 0.01 to about 1 mils, and preferably about 0.1 to 0.2 mils in thickness.

The coating composition for the outer layer 15 comprises a multifunctional acrylate monomer of three or more functional groups, which forms at least 40 percent by weight of the composition, and preferably comprises the major constituent of the composition. Suitable multifunctional acrylate monomers are those having from three to six reactive functional groups. The monomer is selected to preferably provide a relatively compact molecular structure with a large number of reactive sites in the least volume. Examples of multifunctional acrylate monomers include pentaerythritol triacrylate, pentaerythritol tetraacrylate, trimethylolpropane triacrylate, ethoxylated trimethylolpropane triacrylate, dipentaerthritol monohydroxypentaacrylate, di-trimethylol propane tetraacrylate, trimethylolpropane propoxylate triacrylate, glyceryl propoxylate triacrylate, dipentaerthritol pentaacrylate, and pentaacrylate ester.

Optionally mixed with the multifunctional acrylate monomer is a lesser amount of a small monofunctional monomer of very low viscosity. Examples of suitable small, low viscosity monofunctional monomers include tetrahydrofurfuryl acrylate, cyclohexyl acrylate, isobornyl acrylate, isooctyl acrylate, isodecyl acrylate, n-lauryl acrylate, phenoxyethyl acrylate, 2-methoxyethyl acrylate. The small monofunctional monomer can be utilized as a diluent to control viscosity and coating thickness.

Solvents may be used as an alternative or in combination with the small monofunctional monomer, to facilitate control over viscosity and coating thickness. The solvents utilized are typically volatile solvents, and particularly non-polar solvents such as methyl ethyl ketone (MEK), methyl isobutyl ketone (MIBK) and other ketones, toluene, xylene and the like. The outer layer may optionally include conventional additives for radiation curable coatings such as fillers and reinforcing agents, dyestuffs, pigments, heat and light stabilizers, photoinitiators, flattening agents and the like.

The underlying softer radiation cured polymer layer 16 is a crosslinked aliphatic urethane acrylate copolymer which imparts toughness and impact resistance to the coating system. The urethane layer 16 should preferably have a Rockwell hardness ("M" scale) of no more than about 50, and most desirably about 40 or less. The coating composition for the crosslinked aliphatic urethane layer 16 comprises an acrylated urethane resin which comprises at least 40 percent by weight of the copolymer and preferably comprises the major constituent of the copolymer. The copolymer also includes a multifunctional acrylate monomer of three or more functional groups, in a lesser amount than the acrylated urethane resin. Preferably, in order to provide excellent compatibility and adhesion between the outer coating layer 15 and the underlying base coating layer 16, the same multifunctional acrylate monomer is used in the base coating layer 16 as is used in the outer coating layer 15.

Suitable urethane resins include difunctional and multifunctional aliphatic urethane acrylates such as the commercially available aliphatic urethane diacrylate resins sold by Sartomer Company of West Chester, Pa., and identified by the Sartomer TM 9500 and 9600 series products codes. Suitable multifunctional acrylate monomers include those listed above for the outer coating layer. Solvents may be used to facilitate control over viscosity and coating thickness. The coating composition may also include conventional additives, fillers and the like, such as those noted above with respect to the outer coating layer.

The base coating layer may be applied directly to the substrate and cured by suitable means, preferably by exposure to ionizing radiation. If an especially high degree of adherence is required, or if the substrate is one which presents difficulty in obtaining good adherence, the substrate may first be coated with a suitable primer layer, and the base coating layer 16 is applied to the primer layer. Thus as shown in the drawing, a primer layer 17 is adhered directly to the paint layer 11 and indicia markings 12.

In a preferred embodiment of the invention, the primer layer itself is a radiation cured polymer layer. The radiation curable composition for the primer layer 17 is selected for its compatibility with the base layer 16, and preferably includes an acrylate monomer of the same or similar molecular structure as that used in the outer layer 15. For many applications it has been found desirable to use the same coating formulation as is used in the outer layer 15, diluted by the volatile solvent to permit application of a very thin primer coating layer. Conventional adhesion promoting additives, selected for the particular substrate, can be incorporated in the primer coating composition if desired, as can other types of additives, fillers, photoinitiators, etc. which are conventionally used in radiation curable coatings.

Each respective coating layer is applied individually to the substrate and cured prior to application of the next coating layer. Multiple coating layers may be applied. While curing or polymerization of the coatings can be achieved thermally, it is preferred that the coatings be cured by radiation. Polymerization may be initiated by any source of ionizing radiation capable of producing free radicals, including gamma radiation, infrared, microwave, but more typically by electron beam or ultraviolet radiation. Especially suitable is ultraviolet radiation in the 200–400 nm wavelength. When polymerization is by ultraviolet radiation, the coating composition will typically include a photoinitiator compound in accordance with known practices for UV curable compositions. Exemplary photoinitiators include benzophenone and benzophenone derivatives such as 1-hydroxycyclohexyl phenyl ketone sold by Ciba-Geigy of Hawthorne, N.Y. under the trademark "Ciba-Geigy 184," 2-hydroxy-2methyl-1-phenyl propan-1-one sold by EM Industries, Inc. of Hawthorne, N.Y. under the trademark Darocur 1173.

The respective coating layers are applied to the substrate in a conventional manner such as by roll coating, gravure coating, dipping, spraying, etc. The application methods are conventional and may be selected depending upon the nature of the substrate, desired thickness, and other factors. After application, the coating is radiation polymerized in a known manner. The coating compositions are prepared simply by mixing the appropriate monomers, resins and additives in the desired proportions.

The present invention and its advantages over the prior art will be more fully understood and appreciated from the illustrative and comparative examples which follow. Although specific materials, proportions and procedures are given in these examples, it is to be understood that the examples are for purposes of illustration and are not intended as being limiting upon the scope of the invention. Persons skilled in the applicable arts will appreciate from these examples that this invention can be embodied in many different forms other than as is specifically disclosed.

EXAMPLE 1

This example illustrates the application of the coating system of the present invention to a flexible steel measuring tape of the type used in retractable measuring rules. The steel tape had been suitably primed and its surface was painted a solid background color and thereafter imprinted with measurement markings. A coating composition was prepared consisting of 90 parts by weight monohydroxy dipentaerythritol pentaacrylate (Sartomer 399), 5 parts by weight tetrahydrofurfuryl acrylate (Sartomer 285), and 5 parts by weight 1-hydroxycyclohexyl phenyl ketone photoinitiator. This composition was diluted in MEK solvent to 10 percent solids, and was coated onto the surface of the tape by a roll coater to a thickness of about 0.05 mil. The tape was directed under a 3000 watt Fusion Systems Corporation UV curing lamp at 30 feet per minute to cure the primer coating. Then a base coating comprised of 65 parts by weight of acrylated urethane resin (Sartomer 9650), 20 parts by weight monohydroxy dipentaerythritol pentaacrylate (Sartomer 399), 5 parts by weight tetrahydrofurfuryl acrylate (Sartomer 285), and 5 parts by weight 1-hydroxycyclohexyl phenyl ketone photoinitiator was applied to the cured primer coating at 75 percent solids in MEK solvent to a thickness of about 0.5 mil and was cured by exposure to radiation from the UV lamp. Then a 0.2 mil outer coating was applied to the cured base coating. The outer coating was of the same formulation as the primer coating, but was applied at 70 percent solids in MEK solvent and polymerized by exposure to UV radiation from the UV lamp.

The Rockwell hardness of the two coating compositions was measured using ASTM Test Method D-785, Procedure A. The acrylate outer coating composition has a Rockwell hardness ("M" scale) of 124, and the urethane base coating composition had a Rockwell hardness ("M" scale) of 35.

EXAMPLE 2

The impact abrasion resistance of the coated steel tape prepared in Example 1 was measured by the "falling sand" test (ASTM test method D968-51) and was determined to withstand 60 liters of falling sand. Comparison samples of the same steel tape were prepared using similar procedures as in Example 1, but were coated with only a layer of the acrylate outer coating composition and with only a layer of the acrylated urethane base coating composition. The sample containing only the acrylate top coat layer, while exhibiting good chemical and scratch resistance, withstood only 20 liters of falling sand. The sample coated only with the urethane base coated composition withstood only 45 liters of falling sand and had no scratch resistance.

EXAMPLE 3

A UV curable coating composition was prepared from 65 parts by weight monohydroxy dipentaerythritol pentaacrylate (Sartomer 399), 30 parts by weight tetrahydrofurfuryl acrylate (Sartomer 285), and 5 parts by weight 1-hydroxycyclohexyl phenyl ketone photoinitiator. A steel tape similar to that in Example 1 was coated with a 10 percent solids solution of the coating composition in MEK solvent to a thickness of about 0.1 mil and then directed under a UV lamp as in Example 1. Then a base coating comprised of 65 parts by weight of acrylated urethane resin (Sartomer 9503), 20 parts by weight monohydroxy dipentaerythritol pentaacrylate (Sartomer 399), 10 parts by weight tetrahydrofurfuryl acrylate and 5 parts by weight 1-hydroxycyclohexyl phenyl ketone photoinitiator was applied to the cured primer coating at a thickness of about 0.5 mil and was cured by exposure to radiation from the UV lamp. Then a 0.2 mil outer coating of the pentaacrylate ester/tetrahydrofurfuryl acrylate coating composition (90 percent solids in MEK) was applied to the cured base coating and polymerized by exposure to the UV lamp. The resulting coated tape had a highly scratch resistant, impact resistant transparent coating.

EXAMPLE 4

A UV curable coating composition was prepared consisting of 95 parts by weight monohydroxy dipentaerythritol pentaacrylate (Sartomer 399) and 5 parts by weight 2-hydroxy-2methyl-1-phenyl propan-1-one photoinitiator (Darocur 1173). This composition was diluted in MEK solvent to 10 percent solids, and was coated similar to Example 1 onto the surface of the tape by a roll coater to a thickness of about 0.05 mil. The tape was directed under a 1200 watt Fusion Systems Corporation UV curing lamp at 30 feet per minute to cure the primer coating. Then a base coating comprised of 60 parts by weight of acrylated urethane resin (Sartomer 9650), 35 parts by weight monohydroxy dipentaerythritol pentaacrylate (Sartomer 399), and 5 parts by weight 2-hydroxy-2methyl-1-phenyl propan-1-one photoinitiator (Darocur 1173) was applied to the cured primer coating at 50 percent solids in MEK solvent to a thickness of about 0.5 mil and was cured by exposure to radiation from the UV lamp. Then a 0.2 mil outer coating was applied to the cured base coating. The outer coating was of the same formulation as the primer coating, but was applied at 50 percent solids in MEK solvent and polymerized by exposure to UV radiation from the UV lamp.

This example demonstrates that a lesser amount of a small monofunctional monomer of very low viscosity in the outer coating is not necessary although preferred.

EXAMPLE 5

This example illustrates the application of the coating system of the present invention to a wood substrate. A maple block is stained with a 5 percent solution of a dye sold by Sandoz Chemicals, Charlotte, N.C. under the trademark "Savinyl" and 95 percent methyl ethyl ketone.

A UV curable primer coating composition was prepared from 80 parts by weight monohydroxy dipentaerythritol pentaacrylate (Sartomer 399), 15 parts by weight tetrahydrofurfuryl acrylate (Sartomer 285), and 5 parts by weight 1-hydroxycyclohexyl phenyl ketone photoinitiator (Ciba Geigy 184). The wood block was coated with a 20 percent solids solution of the coating composition in MEK solvent to a thickness of about 0.1 mil by spraying with compressed air. The wood block was directed under a 1200 watt Fusion Systems Corporation UV lamp at 30 feet per minute to cure the primer coating.

Then a base coating comprised of 60 parts by weight of acrylated urethane resin (Sartomer 9650), 20 parts by weight monohydroxy dipentaerythritol pentaacrylate (Sartomer 399), 10 parts by weight tetrahydrofurfuryl acrylate (Sartomer 285) and 5 parts by weight photoinitiator (Ciba Geigy 184) was applied to the cured primer coating at a 50 percent solids level in toluene to a thickness of about 0.5 mil and was cured by exposure to radiation from the UV lamp. Then a 0.2 mil outer coating was applied to the cured base coating. The outer coating was of the same formulation as the primer coating, but was applied at 50 percent solids in toluene and polymerized by exposure to radiation from the UV lamp. The resulting wood block had a highly scratch resistant, impact resistant transparent coating.

EXAMPLE 6

This example illustrates the application of the coating system of the present invention to a polymeric substrate.

A UV curable coating composition was prepared as in Example 5 and applied to a 2 mil polyester film (Type 505 manufactured by ICI Americas, Inc., Wilmington, Del.) at a 20 percent solids level, to a thickness of 0.1 mil. The polyester film was directed under a UV lamp as in Example 5 to cure the coating composition. The base coating of Example 5 was applied to the cured primer coating at a 50 percent solids solution in toluene at a thickness of about 0.5 and was cured by exposure to radiation from the UV lamp. Then a 0.2 mil outer coating of the pentaacrylate ester/tetrahydrofurfuryl acrylate coating composition (50 percent solids in toluene) of Example 5 was applied to the cured base coating and polymerized by exposure to the UV lamp. The coated polyester film had a highly scratch resistant, impact resistant transparent coating.

EXAMPLE 7

This example illustrates the addition of an adhesion promoter to the primer coating to facilitate adhesion to a metal substrate.

A UV curable primer coating composition was prepared consisting of 70 parts by weight monohydroxy dipentaerythritol pentaacrylate (Sartomer 399), 15 parts by weight tetrahydrofurfuryl acrylate (Sartomer 285), 5 parts by weight photoinitiator (Ciba Geigy 184) and 10 parts by weight of an acrylate ester derivative adhesion promoter sold under the trademark "Ebercryl 170" by Radcure Specialties of Norfolk, Va. The primer coating composition was applied to an aluminum disk and cured, and the base coating and outer coating were prepared and applied as in Example 5. The resulting aluminum disk had a highly scratch resistant, impact resistant, transparent coating.

That which is claimed is:

1. An abrasion resistant, clear, transparent and non-yellowing coating system for imparting a highly scratch resistant, chemical resistant, impact resistant protective finish to a substrate comprising a relatively hard outer coating layer of a highly crosslinked acrylic copolymer derived from at least 40 percent by weight of a multifunctional aliphatic acrylate monomer of three to six functional groups adhered to a relatively soft base coating layer comprising at least 40 percent by weight of a crosslinked aliphatic urethane acrylate copolymer and a lesser proportion of said multifunctional aliphatic acrylate monomer of three to six functional groups.

2. The coating system as defined in claim 1, wherein said highly crosslinked acrylic copolymer is a relatively hard radiation polymerized acrylic polymer of Rockwell Hardness ("M" scale) of at least 105, and said crosslinked aliphatic urethane acrylate copolymer is a relatively soft radiation polymerized urethane copolymer of Rockwell Hardness ("M" scale) of no more than 50.

3. The coating system as defined in claim 1, wherein said multifunctional acrylate monomer comprises a pentafunctional acrylate monomer.

4. The coating system as defined in claim 3, wherein said highly crosslinked acrylic polymer of said outer coating layer is a copolymer derived from at least 40 percent by weight of said pentafunctional acrylate monomer and a lesser amount of a monofunctional acrylate monomer.

5. The coating system as defined in claim 1, additionally including a primer coating layer of a highly crosslinked acrylic copolymer, and wherein said base coating layer is adhered directly to said primer coating layer.

6. The coating system as defined in claim 5, wherein said primer coating layer is formed of the same highly crosslinked acrylic copolymer as said outer coating layer.

7. An abrasion resistant, clear, transparent and non-yellowing coating system for imparting a highly scratch resistant, chemical resistant, impact resistant protective finish to a substrate comprising an outer coating layer of hard radiation cured acrylic copolymer including a multifunctional acrylate monomer of three to six functional groups adhered to a base coating layer of softer radiation cured urethane copolymer derived from at least 40 percent by weight of a crosslinked aliphatic urethane acrylated copolymer and a lesser proportion of said multifunctional acrylate monomer of three to six functional groups adhered to a primer coating layer of the hard radiation cured acrylic copolymer.

8. The coating system as defined in claim 7, wherein said multifunctional monomer of three to six functional groups is a pentafunctional acrylate.

9. The coating system as defined in claim 7, wherein said acrylic copolymer is derived from about 65% by weight of said pentafunctional acrylate monomer and about 30% by weight of said monofunctional acrylate monomer.

10. The coating system as defined in claim 7, wherein said acrylic copolymer is derived from about 90% by weight of said pentafunctional acrylate monomer and about 5% by weight of a monofunctional acrylate monomer.

11. The coating system as defined in claim 7, wherein said urethane copolymer is derived from about 65% by weight of a difunctional or multifunctional aliphatic urethane acrylated resin and about 20% by weight of said multifunctional acrylate monomer.

12. An article of manufacture comprising a substrate and a highly scratch resistant, chemical resistant, impact resistant protective finish on said substrate, said finish comprising a highly crosslinked acrylic copolymer, derived from at least 40 percent by weight of a multifunctional aliphatic acrylate monomer of three to six functional groups, adhered to a base coating layer of softer radiation cured urethane copolymer derived from at least 40 percent by weight if an aliphatic urethane acrylate copolymer and a lesser proportion of said multifunctional aliphatic acrylate monomer of three or more functional groups adhered directly to the substrate.

13. The article as defined in claim 12, wherein said substrate comprises a metal.

14. The article as defined in claim 1, wherein said substrate comprises wood.

15. An article of manufacture comprising a substrate and a highly scratch resistant, chemical resistant, impact resistant protective finish on said substrate, said finish comprising a highly crosslinked acrylic copolymer, derived from at least 40 percent by weight of a multifunctional aliphatic acrylate monomer of three to six functional groups adhered to a base coating layer of softer radiation cured urethane copolymer derived from at least 40 percent by weight of an aliphatic urethane copolymer and a lesser proportion of said multifunctional aliphatic acrylate monomer of three to six functional groups adhered to a primer coating layer of highly crosslinked acrylic copolymer adhered directly to the substrate.

16. The article as defined in claim 15, wherein said substrate comprises a metal, and said primer coating includes an adhesion promoter for metal.

17. The article as defined in claim 15, wherein said substrate comprises wood.

* * * * *